Figure 3:
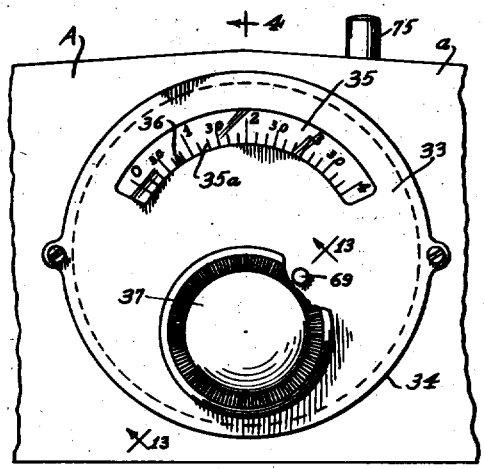

Oct. 29, 1935.　　　F. HAUSER　　　2,019,008
VALVE TIMING DEVICE
Filed Oct. 25, 1933　　　5 Sheets-Sheet 1

Inventor
Fred Hauser

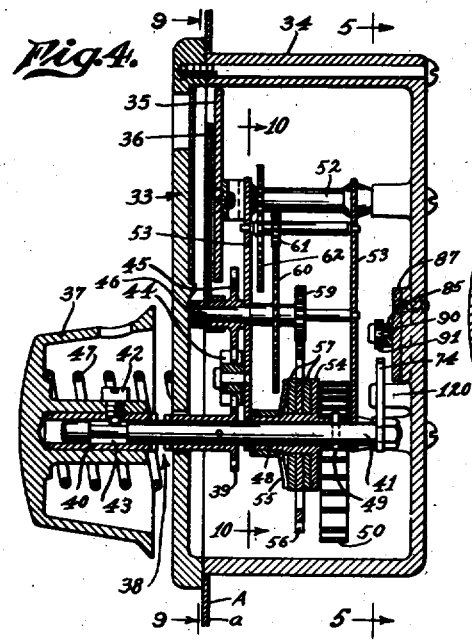

Oct. 29, 1935.  F. HAUSER  2,019,008
VALVE TIMING DEVICE
Filed Oct. 25, 1933   5 Sheets-Sheet 3
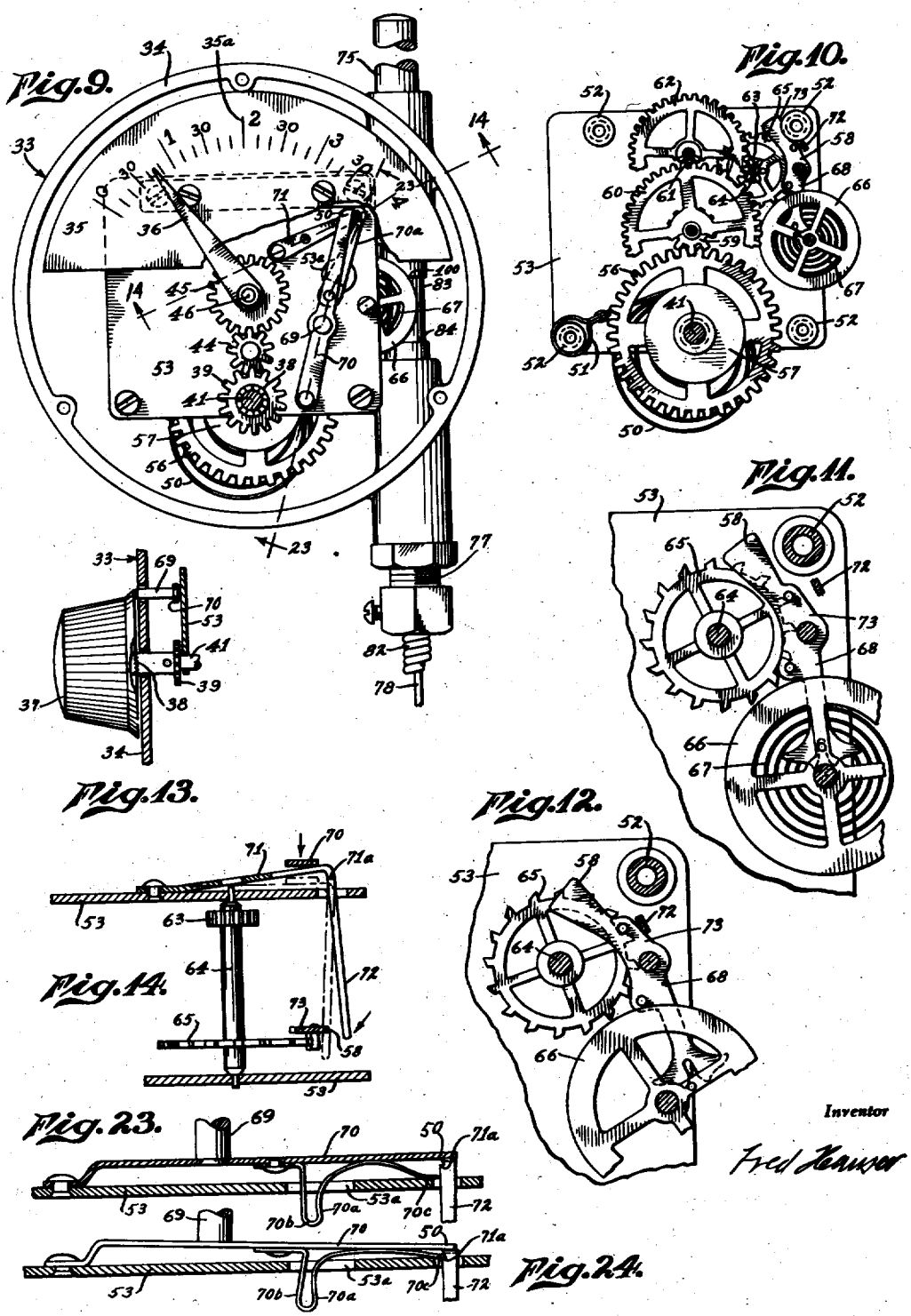

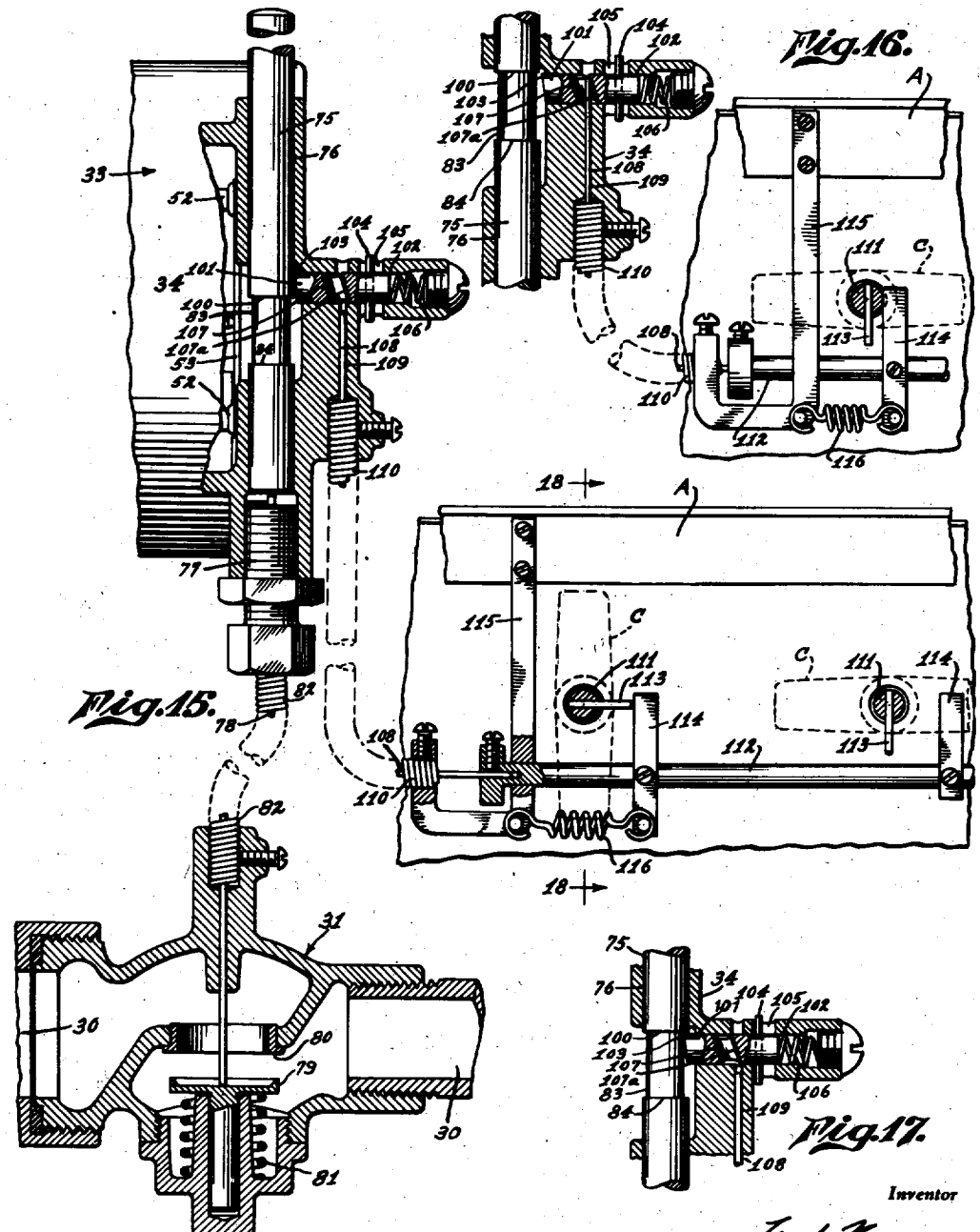

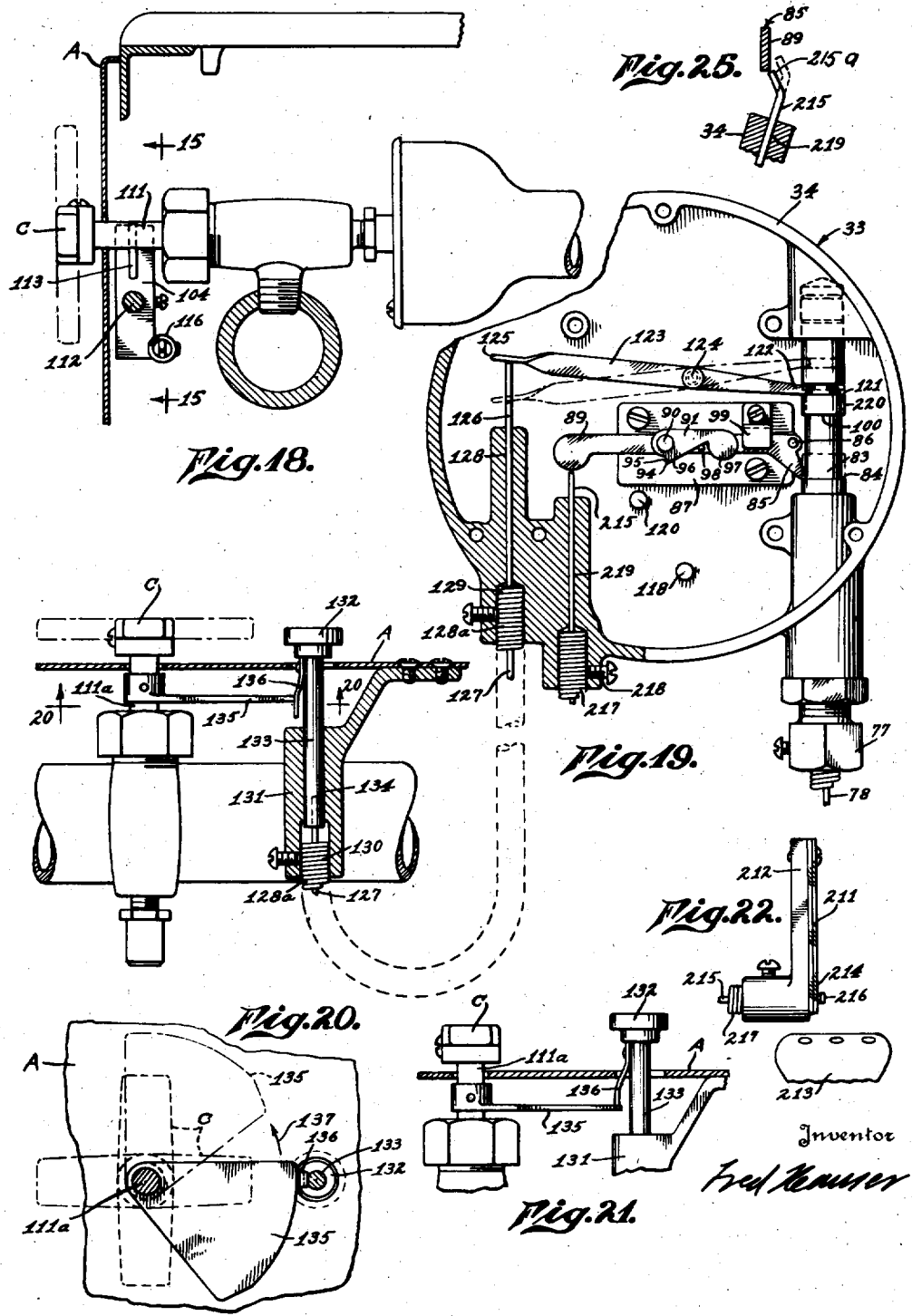

Patented Oct. 29, 1935

2,019,008

UNITED STATES PATENT OFFICE 2,019,008

VALVE TIMING DEVICE

Fred Hauser, Pasadena, Calif.

Application October 25, 1933, Serial No. 695,105

13 Claims. (Cl. 161—9)

This invention relates to control devices and more particularly to a timing device for a gas stove by means of which the housewife may predetermine a time period during which cooking shall take place, at the end of which time period, the gas supply will automatically be cut off.

It is an object of this invention to provide such a device which will be simple to operate and completely foolproof.

It is a further object to provide a device of this kind whereby the housewife may by a single operation set the device, which will then perform its function without further attention.

It is another object to provide such a device in which the time period set may be lengthened or shortened at any time after setting.

It is a further object to provide a device of this kind in which the danger usualy attendant on such devices is eliminated by appropriate interlocking devices.

A still further and important object of this invention is to provide a device of this type which is sturdy and certain in operation, and which may be easily adapted to all of the various conditions encountered in stove installations, and which does not require external power connections.

With these and other objects in view, which will be apparent from the reading of the specifications and drawings, the invention comprises the combination of the various parts, members and features, two embodiments of which are shown in the drawings and described in the specification, and will be finally pointed out in the claims.

Figure 1:
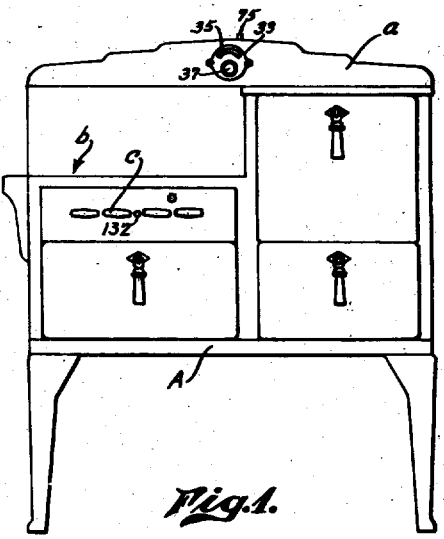
Figure 2:
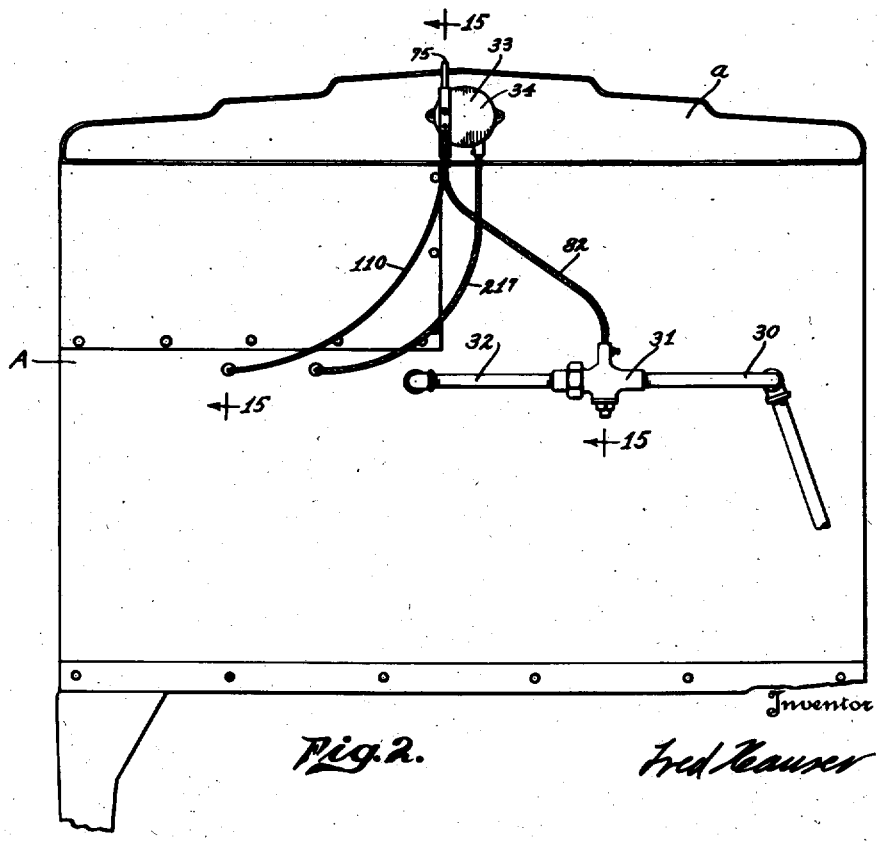

Fig. 1 shows a gas stove embodying my invention; Fig. 2 is a rear view of the gas stove of Fig. 1 showing the manner of application and connection of my invention to said stove; Fig. 3 is a face view of the control device of my invention, Fig. 4 is a sectional view taken on line 4—4 of Fig. 3; Fig. 5 is a sectional view taken on line 5—5 of Fig. 4 portions of the device beyond the plane of the section being omitted for clearness of illustration; Figures 6, 7, and 8, are fragmentary details of a portion of the showing of Fig. 5 in different positions thereof; Fig. 9 is a sectional view taken on line 9—9 of Fig. 4; Fig. 10 is a sectional view taken on line 10—10 of Fig. 4; Figures 11 and 12 are enlarged fragmentary details of portions of the showing of Fig. 10 in other positions thereof; Fig. 13 is a sectional view taken on line 13—13 of Fig. 3; Fig. 14 is a sectional view taken on line 14—14 of Fig. 9; Fig. 15 is a conventionalized section taken on line 15—15 of Figs. 18, 2 and 5; Fig. 16 illustrates a portion of the showing of Fig. 15 in another position thereof; Fig. 17 is a fragmentary showing of a portion of Fig. 16 in still another position thereof; Fig. 18 is a sectional view taken on line 18—18 of Fig. 15; Fig. 19 is a sectional view of a modified form of my invention; Fig. 20 is a sectional view taken on line 20—20 of Fig. 19; Fig. 21 is a fragmentary view of a portion of Fig. 19 in another position thereof; Fig. 22 is a detail of a portion of the showing of Fig. 5 in another position thereof. Fig. 23 is a sectional detail taken on line 23—23 of Fig. 9; Fig. 24 is a section similar to Fig. 23 showing another position of the parts thereof; Fig. 25 is a fragmentary detail of a portion of the showing of Fig. 5 taken on line 25—25 thereof.

The stove A consists of the usual frame and covering a having burners b controlled by the handle c. Gas is supplied to the burners through the pipe 30, and through the valve 31 to the burner supply pipe 32. The control device 33, forming a part of my invention, is affixed to any convenient portion of the stove, and consists of a housing 34, within which is mounted a dial 35, upon which indicia 35a indicate hours and minutes, and over which plays the pointer 36. The setting knob 37 is adapted to set the pointer 36 through the jaw clutch 38 and gear 39. Jaw clutch 38 comprises a sleeve 40 slidable upon the control shaft 41 and retained thereon by the dog screw 42 operating in the shaft recess 43. Sleeve 40 is mounted in and forms the hub of the setting knob 37, the inner end being toothed to mesh with cooperating teeth upon the hub of gear 39. Gear 39 meshes with an intermediate gear 44 which in turn meshes with and drives the pointer gear 45 attached to the pointer 36 and journalled upon the shaft 46. Compression spring 47 between the knob 37 and housing 34, presses knob 37 continually outward, holding the teeth of sleeve 40 out of engagement with the teeth of the hub of gear 39, so that the clutch 38 is normally disengaged. Upon inward pressing of the knob 37, the clutch teeth engage, and rotation of the knob sets the pointer 36 through gears 39, 44, and 45.

Gear 39 is rigidly attached to the control shaft 41, and said shaft is therefore rotated when the pointer is set by an amount exactly in proportion to the movement of the pointer. A sleeve 48 is likewise attached to the shaft 41, as by pin 49, to which is also attached one end of a main spring 50. The other end 51 thereof its attached to one of the spacers 52 connecting the side plates 53 in which shaft 41 is journalled. The spring 50 is so mounted that it will be wound by rotation of the setting knob 37 in a direction to move the pointer 36 to the right in Figure 3. The sleeve 48 is made with a flange 54, and carries opposed to this flange a star spring 55. A gear 56 is carried on the sleeve 48 between a pair of friction plates 57, which in turn are carried between the star spring 55 and the flange 54, the star spring holding gear and plates in frictional contact with each other.

Gear 56 is connected to escapement gearing 58 by a train of clock gears 59, 60, 61, 62, and 63, the latter of which is on the escapement ratchet shaft 64, carrying the ratchet 65, controlled and timed by the balance wheel 66, hair spring 67, and lever escapement 68, in the usual manner of clock gearing.

A starting mechanism is incorporated in the control device and is best illustrated in Figures 9 to 14 inclusive. A pin 69 projects through the housing 34 under the rim of the setting knob 37, in such relation as to be depressed thereby upon the inward movement of the knob 37 necessary in setting operations to engage the jaw clutch 38. The pin 69 is attached to a leaf spring 70, carried by one of the side plates 53. The free end of this spring 50 overlies a second leaf spring 71, also attached to one of the plates 53, and extending downward through an opening therein to form a starting arm 72. This arm is adapted to engage the pallet lever 73 of the escapement 68, in such a manner as to rotate the balance wheel 66 against the resistance of the hair spring 67 when the pin 69 is depressed by knob 37. (See Fig. 12.) Riveted to the under side of the leaf spring 70 is a catch spring 70a which extends downwardly therefrom through an opening 53a in the side plate 53 in the form of a loop 70b. The opposite end thereof rests under pressure on top of the plate 53 adjacent the second leaf spring 72. A notch 71a is formed in the latter for engagement therewith. Upon pressure on the knob 37 and consequent depression of the spring 70, the end 70c of the catch spring 70a is urged toward the second leaf spring 72, engaging the notch 71a when at the extreme downward limit of motion. The arm 72 is held thereby in the dotted position of Fig. 14 until end 70c is withdrawn from notch 71a when pressure on knob 37 is fully relieved. Thereupon, the energy stored in spring 71 and thus in hairspring 67, held thereby, is suddenly released, and the clockwork mechanism is started with sufficient energy to insure positive starting thereof. Otherwise, a slow release of pressure on knob 37 might not supply sufficient energy to complete the required amount of swing of the lever of escapement 68 to effect the necessary release thereof. Upon the release of the pressure upon setting knob 37, the arm 72 retracts to the original position (see Fig. 11) and the energy of the hair spring starts the escapement mechanism 58, power being furnished by the main spring 50 to continue the operation back through the gearing 63, 62, 61, 60, 59, and 56, and through the friction plates 57 to the sleeve 48 and shaft 41, and then through gears 39, 44, and 45 to move the pointer 36 back to "0" position on the dial 35.

During the manual setting of the pointer 36, knob 37 is depressed until the clutch 38 engages and rotated by the operator until the pointer reaches the desired position. During this operation the friction plates 57 slip, thus permitting such setting without damaging the gearing to the escapement mechanism 58. They also permit movement of the pointer and connected gearing in either direction, so that the time period desired may be accurately and easily set.

To the innermost end of the shaft 41 is attached a cam lever 74, adapted to operate the trip mechanism to control the fuel supply as will now be described. A plunger 75 is slidably mounted in the bore 76 of the housing 34. At the lower end of the housing is a bushing 77, serving as a guide for a push wire 78, which transmits movement of the plunger to valve 31. Downward movement of the plunger 75 through this push wire depresses the valve disc 79 of the valve 31, forcing it away from its seat 80 against the resistance of valve spring 81. Valve 31 is opened thereby to permit gas to pass through from pipe 30 to supply pipe 32 and to the burners b. Push wire 78 is inclosed in a wire spring conduit 82 to guide it closely and permit the transmittal of the necessary force through the flexible wire, regardless of the relative location of the valve 31 and control device 33.

The plunger 75 is made with a circumferential recess 83, forming an upward directed shoulder 84 for coaction with a trip lever 85, pivoted at 86 to a bracket 87 attached to the housing 34. Pivot 86 is as close to the center line of the contact of the trip lever 85 with the shoulder 84 as is practical in order to minimize forces in the "set" position. Trip lever 85 is of bell crank form, having one end 88 extending downward for cooperation with the shoulder 84 and the other end 89 extending horizontally outward from the pivot 86 to a considerable length to provide a weighted leverage holding the end 88 against the plunger. The end 89 overlies the cam lever 74 on shaft 41 and is fitted with a pivot 90 above the center line of said shaft for the reception of a click 91, adapted to cooperate with the cam lever 74.

Cam lever 74 is formed with a bevelled face 92 at its outward end, and a substantially radial face 93. Click 91 is formed with a tooth 94 extending downwardly from pivot 90 into the path of the cam lever 74, the radial face 95 of such tooth being adapted to contact the radial face 93 of the cam lever 74. The opposite face 96 of tooth 94 is bevelled to cooperate with bevelled face 92 of the cam lever 74. Click 91 is provided with a weighted end 97, extending from the pivot 90 toward the pivot 86 of the trip lever 85, and a pin 98 set in trip lever 85 supports click 91 in position with the tooth 94 in the position shown in Fig. 5. A guide clip 99 maintains trip lever 85 in proper position.

Interlocking mechanism between the control device and the burner cocks of the stove is provided as follows: The circumferential recess 83 in plunger 75 also provides a downwardly directed shoulder 100, adapted to cooperate with a horizontal lock plunger 101, slidably mounted in a bore 102 in the housing 34. This plunger 101 is provided with a tip 103 for contact with the shoulder 100 and a pin 104, operating in a slot 105 in the housing 34, keeps said tip 103 in proper position. The plunger 101 is continuously urged toward the plunger 75 by a spring 106, but is provided with a cross slot 107, bevelled upwardly and toward plunger 75 for the reception of a lock wire 108. Lock wire 108 is slidable in bore 109 parallel to plunger bore 76 in the housing 34, and operates through a wound wire conduit 110, which carries it to a point adjacent to the burner cock stems 111 where the lock wire 108 is connected to a slide rod 112.

Each of the burner cock stems 111 is provided with a pin 113, adapted to cooperate with a corresponding arm 114, attached to the slide rod 112. Slide rod 112 is mounted to slide in brackets 115, one of which supports the adjacent end of the conduit 110. A tensile spring 116, having one end attached to one of the arms 114 and the other end attached to a bracket 115, continually urges the arms 114 against the cock stems 111, and likewise thus urges the lock wire 108 upward to enter the bevelled cross-slot 107 of the lock plunger 101. The rearward face of 107a of such slot 107 serves as a cam, so that upward movement of the wire 108 withdraws the lock plunger 101 from beneath shoulder 100 against the force of spring 106.

Operation is as follows: During all normal operations of the stove, the plunger 75 is depressed and retained in "down" position by the trip lever 85. When it is desired that the control mechanism be used to shut off the fuel supply at a certain time interval later, the housewife presses the setting knob 37 inward, at the same time rotating it clockwise until the pointer designates, say "1", which will indicate that the gas will shut off in one hour.

Rotation of the setting knob through the jaw clutch 38 rotates the shaft 41, winding the main spring 50, and rotating the cam lever 74 in the direction of the arrow 117. Limit pin 118 is provided to stop rotation when the limit of the control period provided by the control device has been reached. During such rotation of the shaft 41, the friction plates 57 slip, so that such motion is not transmitted through the timing gearing. When the radial face 93 of the cam lever 74 strikes the radial face 95 of the click tooth 94, the click 91 pivots as shown in Fig. 6, to permit passage of the cam lever beyond it. After cam lever 74 has passed, the weighted end 97 insures return of the click to its original position against the pin 98.

The pressure upon the setting knob 37 also depresses the pin 69, and through its movement, as previously described, moves arm 72 against the escapement lever 73, displacing the latter. Release of the setting knob permits return of the escapement lever with sufficient force to start regular timing of the clockwork by the balance wheel and hair spring to gradually release the energy stored in the main spring 50 by the initial rotation of shaft 41, returning shaft 41, cam lever 74, and pointer 36 to their original positions. At any time thereafter, the time may be increased or decreased by operation of the setting knob as before.

As the cam lever 74 under the drive by the mainspring is now rotating in the direction of the arrow 119, the bevel face 92 thereof contacts the bevel face 96 of the click to tend to rotate the same about its pivot 90 in a clockwise direction. This, however, is prevented by the pin 98. Therefore, the trip lever 85 is rotated sufficiently in a clockwise direction to release the end 88 from the shoulder 84, thus permitting the valve disc 79 to close against the valve seat 80 under the power of the spring 81, closing off the fuel supply to the stove. Through the push wire 78, closing of the valve as described also raises the plunger 75. Lever 74 continues until striking pin 120, as shown in Fig. 8, when further movement is prevented and the timing movement is stopped.

In order to again operate the stove, the housewife merely again presses the plunger, after which she may turn individual burners on and off manually as many times as she may desire, in the same manner as if there were no automatic control of the stove, until she again desires to use the control device.

To insure against thoughtless turning on of the gas by opening valve 31 without first closing the burner through which the automatic control had been operating, the interlocking feature is provided. As long as any of the burners are open the slide rod 112 will be held in the position, shown in Fig. 15, the wire 108 thus being retracted from the cross-slot 107, and the plunger 101 being under spring pressure against the plunger 75. At the end of the time period, when trip lever 85 releases plunger 75, as described, as the plunger rises the tip 103 of plunger 101 slips under the shoulder 100, as in Fig. 17, preventing depression of said plunger, and thus preventing reopening of the valve 31 until plunger 101 is withdrawn. Upon closing of all the burners, tensile spring 116 pulls the slide rod 112 to the left, as shown in Fig. 15, to the position, shown in Fig. 16, pushing the wire 108 through the conduit 110 upward, the tip thereof contacting the face 107a of the cross slot 107, the cam action thereof withdrawing the plunger 101 against the spring 106. After this the plunger 75 may again be depressed, opening the valve 31.

An additional safety feature is provided by providing for thermostatic control of the tripping mechanism, whereby if the burner being controlled should blow out or the pilot control thereof go out for any reason, the main control valve 31 would close to prevent the escape of gas.

This control is best shown in Fig. 5. A bimetallic thermostat spring 211 is attached to a support 212 and extends into the flame zone of the burner 213, which may be either pilot or main burner. The end 214 of the spring 211 carries a push wire 215 provided with enlargements 216 on either side of the spring 211. The push wire 215 leads through a wound wire conduit 217, carried by the support 212 to a point beneath the end 89 of the trip lever 85. The conduit is affixed to the housing 34 at 218, and a bore 219 in housing 34 serves as a guide to the push wire 215. As long as the thermostatic spring is heated, the push wire 215 is held out of contact with trip lever 85, as illustrated. Should the burner go out, the spring 211 retracts to the position shown in Fig. 22, and during its passage thereto pushes wire 215 against trip lever 85, operating it to release the plunger 75 and thus close valve 31 in the same manner as previously described. As shown in Fig. 25, push wire 215 is so bent at 215a as to release itself from lever 85 as the thermostat spring 211 reaches the completely cooled position of Fig. 22.

In Figs. 19, 20, and 21 is shown another form of this invention in which other connections are provided for manual control and interlock. The plunger 220 is shorter than corresponding plunger 75 and does not extend above housing 33 for manual opening of the valve 31. This valve is opened by the following mechanism:

The plunger 220 is grooved as at 121 for the reception of the end 122 of lever 123 pivoted to housing 34 at 124. The other end thereof 125 is flattened and overlies one end 126 of the push wire 127, guided in a bore 128 in housing 34. Push wire 127 is carried in wound wire conduit 128a attached at one end 129 to housing 34, and at the other end 130 to support 131 attached to the stove A, adjacent the burner control handles C. A conveniently located push button 132 is attached to a stem 133, guided in a bore 134 in the support 131. The push wire 127 is affixed to the stem 133.

To the burner cock stem 111a is attached a cam disc 135. A spring catch 136 is attached to the stem 133 for cooperation therewith. To open the valve 31, the push button 132 is pressed and thru push wire 127 lever 123, the plunger 220 is depressed opening valve 31 thru the medium of push wire 78 as described. Should burner cock stem 111a be rotated to "on" position, as shown in full lines of Figs. 20 and 21, spring catch 136 will strike disc 135 and prevent the opening of the valve. When the burner is turned off by rotating stem 111a in the direction shown by the arrow 137, the push button can be depressed to open valve 31. Thus, as long as a burner controlled by the stem 111a is open, valve 31 cannot be opened. Stem 111a may comprise a master valve controlling several burners or may control but one.

Having thus described these embodiments of my invention without limitation to the forms described and illustrated, I claim and desire to secure by Letters Patent:

1. In a device of the character disclosed, an auxiliary valve a main valve controlling the supply of fuel to said auxiliary valve, a burner supplied with fuel by said auxiliary valve, means for manually opening said main valve, a timing device, setting means therefor, a trip device actuated thereby, closing means for said main valve associated with said trip device to be set into operation thereby, interlocking connections between said auxiliary valve and said manual opening means for said main valve, whereby operation of said opening means to open said main valve is prevented while said auxiliary valve is open.

2. In a device of the character disclosed, a valve controlling the supply of fuel to a heating device, means for opening said valve, a timing device, setting means therefor, said setting means including a manually operated handle, a clutch engageable therewith, means for disengaging said handle therefrom automatically upon removal of operating force from said handle a starting device for said timing device automatically operated upon disengagement of said clutch to start said timing device in operation, and closing means for said valve adapted to be set in operation by said timing device after a predetermined time interval.

3. A device as described in claim 2 and including a catch spring associated with said starting device adapted to effect impulsive starting thereof.

4. In a valve timing device, a clock mechanism, a member driven thereby, valve closing means, a trip operable by said member at a certain position thereof to permit operation of said valve closing means, setting means for said member, a clutch providing connection therebetween for setting of said member, and a starting device for said clock mechanism associated with said setting means to be automatically operated upon release of said clutch.

5. A device as described in claim 4 and including a catch spring associated with said starting device adapted to effect impulsive starting thereof.

6. A device as described in claim 4 in which setting of said member winds said clock mechanism.

7. A device as described in claim 4 and including a friction clutch between said member and said clock mechanism, whereby the time interval determined by the setting thereof may be increased or diminished subsequent to the initial setting.

8. A device as described in claim 4 and including a catch spring tensioned upon engagement of said clutch and adapted to restrain operation of said starting device until said clutch has been disengaged.

9. A device as described in claim 4 and including a spring pressed pin associated with said starting device and adapted to be engaged by said setting means upon engagement of said clutch.

10. In a timing device adapted for setting to perform an operation at a given time and provided with a main shaft having a frictional control from escapement gearing, a setting knob, a clutch connection between the main shaft and said knob, means for automatically disengaging said clutch upon release of pressure from said knob, a starting device cooperative with said escapement gearing to start same in motion, means for tensioning said starting mechanism upon application of pressure to said knob whereby release of said pressure will effect starting of said timing device.

11. A device as in claim 10 and including a catch associated with said starting device and adapted to maintain said tensioning in said starting mechanism until said clutch is completely disengaged.

12. A time operated valve mechanism including means for automatically closing a main valve at a predetermined time interval, means for manually opening said main valve, an auxiliary valve supplied with a flow medium thru said main valve and means associated with said auxiliary valve and said valve opening means to lock said main valve opening means and prevent such manual opening when said auxiliary valve is open.

13. A device as described in claim 12 and including a plurality of such auxiliary valves, said locking means being operatively associated with a plurality of said auxiliary valves and with said opening means whereby manual opening of said main valve is prevented when any of said auxiliary valves is open.

FRED HAUSER.